Aug. 9, 1938.    W. J. WALSH    2,126,593
ANIMAL HOLDING CHUTE
Filed April 1, 1937    2 Sheets-Sheet 2
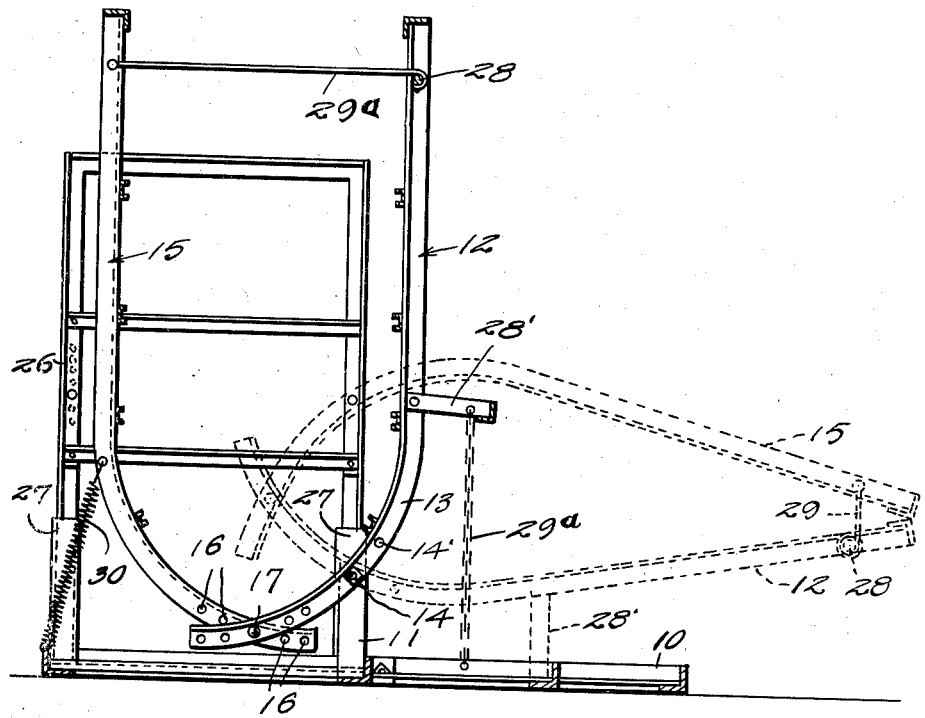
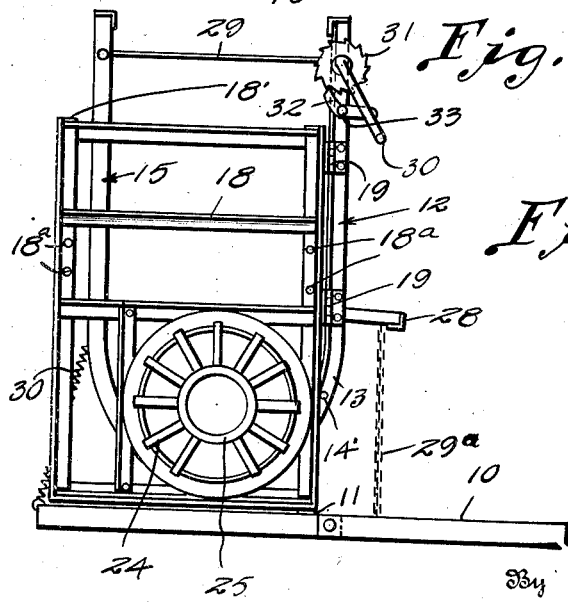
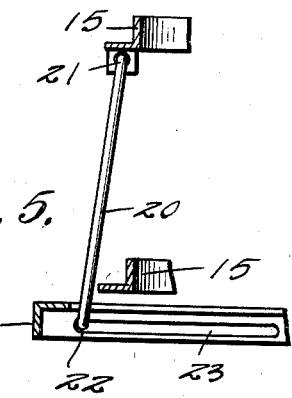
Inventor
W. J. Walsh
By L. F. Randolph
Attorney

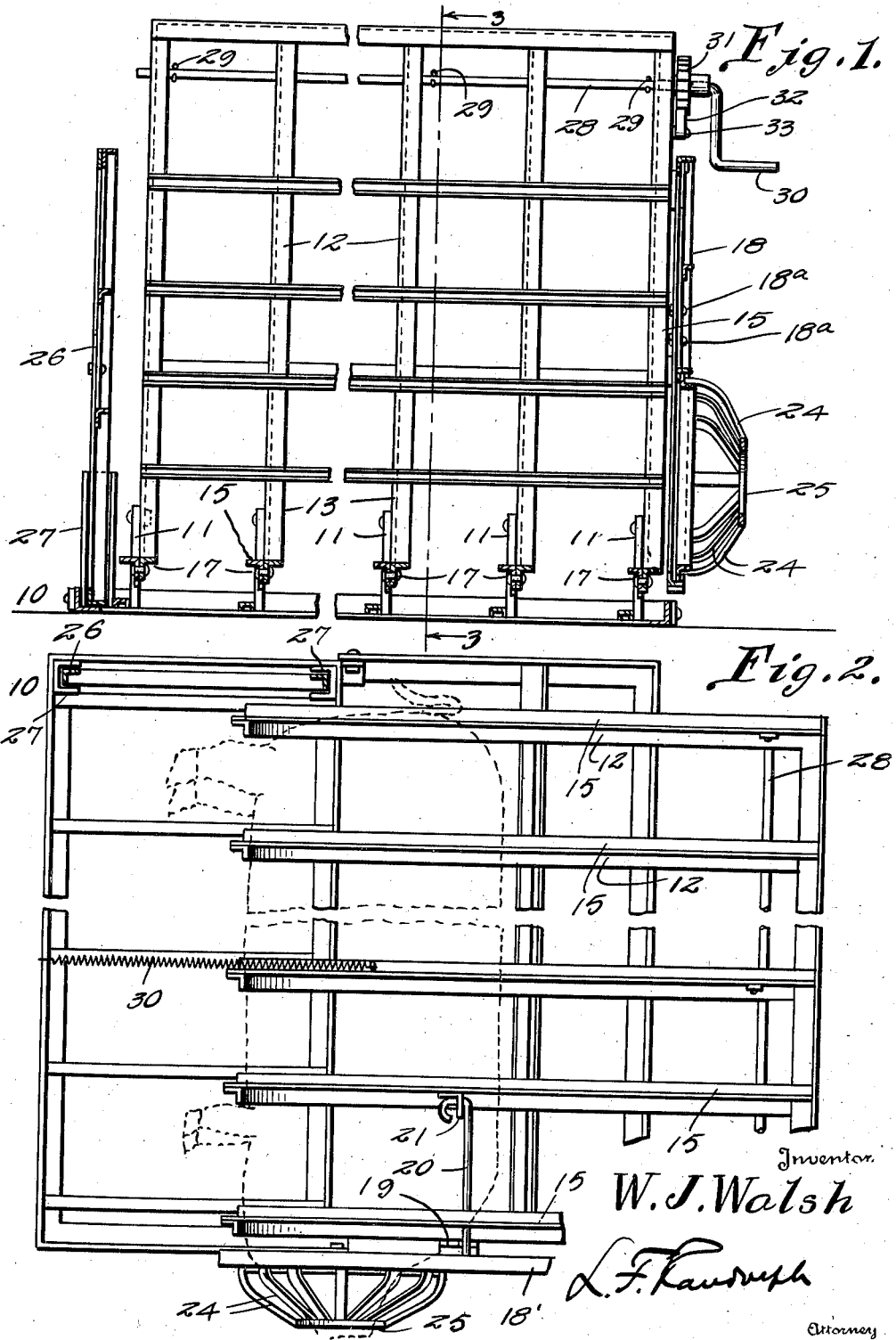

UNITED STATES PATENT OFFICE 2,126,593

ANIMAL HOLDING CHUTE

William J. Walsh, Creston, Iowa

Application April 1, 1937, Serial No. 134,446

1 Claim. (Cl. 119—98)

This invention relates to an animal holding apparatus or chute primarily adapted for use on a farm or ranch and more specifically for the holding of hogs, sheep, goats, dogs or other animals in a humane manner and in a lateral recumbent position to facilitate vaccination, ringing, castration, slaughter or other operations.

It is particularly aimed to provide a construction wherein the animal is held in a humane manner against bodily movement relatively to the apparatus.

It is also aimed to provide a construction wherein the chute has walls with normally parallel portions and with lower arcuate portions, which walls are adapted for relative swinging to clasp the animal then to be moved bodily to the horizontal.

It is also an object to provide a gate to permit entry of the animal, and a gate or wall to enable departure of the animal, the latter having means particularly engageable by the head.

The more specific objects and advantages will become apparent from a consideration of the description following taken in connection with accompanying drawings illustrating an operative embodiment.

In said drawings:—

Figure 1 is a view in substantially central longitudinal vertical section through the apparatus;

Figure 2 is a plan view of the apparatus, a hog being shown in dotted lines and the parts being in position for operation on the hog;

Figure 3 is a vertical sectional view taken on the line 3—3 of Figure 1, with the operative position of the parts suggested in dotted lines;

Figure 4 is a front view of the apparatus, and

Figure 5 is a detailed section illustrating the latch mechanism for the departure gate or wall.

Referring specifically to the drawings wherein like reference characters designate like or similar parts, a skeleton rectangular frame 10 constitutes the base of the device which has a series of studs 11 rising therefrom. A confining wall 12 straight throughout the major portion of its area, also has an arcuate portion 13, and the latter, by means of bolts or the equivalent 14 is pivotally connected to the studs 11.

A wall 15 is similar in size, shape and material to the wall 12. Said walls 12 and 15 have a series of openings 16 through which bolts 17 are passed to pivotally secure them together. The various openings 16 enable adjustment of the parts according to the size of the animal to be operated on.

A front wall or gate is provided at 18 being hinged at 19, on a vertical axis, to the wall 12 and it is adapted to move with that wall.

Such gate 18 is normally maintained closed or parallel to the wall 12 by a latch bar 20 loosely pivoted at 21 to the wall 15 and at its other end having a lug 22 engaged in a slot 23 one of the structural members of the gate, such slot being elongated to accommodate movement of the latch with wall 15 relatively to the gate 18 and wall 12.

It is to be noted that the gate or wall 18 has a muzzle-like structure at 24 into which the head of the animal is disposed and which structure has a central opening 25 through which the nose or snout may project.

The gate 18 is slidably mounted in a frame 18' and held in adjusted positions by means of a pin or bolt 18a engaging in registering openings in gate 18 and frame 18'. In order to accommodate the chute to animals of longer or shorter legs a plurality of openings 14' are provided in the arcuate portion 13.

An entrance gate 26 is provided at the rear of the walls 12 and 15 and the same is removably mounted in guides or uprights 27 rising from the base 10, which guides or uprights are of U-shape in cross section so as to slidably engage the entrance gate.

Animals may enter the apparatus when the entrance gate 26 is detached and the walls 12 and 15 are in parallelism as shown in Figure 3. After the animal enters, the head engages in the muzzle 24 and the gate 26 is replaced. Thereupon the walls 12 and 15 are moved toward each other at their upper ends so as to grasp a hog or other animal and securely hold it in a firm but humane manner. To this end, a windlass shaft 28 is journaled on the wall 12 adjacent the top thereof and a plurality of cables 29 are connected thereto and to the wall 15. A crank 30 is connected to the windless shaft and operable to wind the cables or other flexible elements 29a thereon or to release them. On the windlass shaft is a ratchet wheel 31 and coacting therewith is a pawl 32 pivoted at 33 to the wall 12, the pawl coacting with the ratchet to prevent undesired unwinding of the flexible element 29a.

After the animal is grasped in the manner described, the walls 12 and 15 and the wall 18 attached to the former are tilted to the dotted line position shown in Figure 3, corresponding to the full line position shown in Figure 2, thus disposing the animal in a recumbent position with the ventral regions accessible for any desired operation or purpose. In such horizontal position, walls 12 and 15 are supported by rest 28' attached to the former and chains or the equivalent 29 are connected to the base 10 and rest 28', limiting return of the walls 12 and 15 to normal position to which position they are urged by a relatively strong and tractile coil spring 30 fastened to the wall 15 and to the base 10.

Attention is called to the fact that the gates 18 and 26, wall 10 and restraining walls 12 and 15 are of skeleton openwork construction, preferably being made up of angle steel element or the equivalent connected together at their point of contact in any suitable manner as by welding or by means of rivets.

Various changes may be resorted to provided they fall within the spirit and scope of the invention.

I claim as my invention:—

An apparatus of the class described, having a base, studs on said base, a confining wall having an arcuate portion, means pivoting said arcuate portion to said studs, a confining wall pivoted to the arcuate portion of the first mentioned confining wall, means operable to draw the confining walls together at their free ends, spring means connected to one of the walls and the base urging the confining walls to normal position, means connected to the base and one of the confining walls limiting movement of the confining walls to normal position, guides on said base, a displaceable entrance gate adjacent one end of said wall mounted by the guides, and an exit wall pivoted to one of the confining walls.

WILLIAM J. WALSH.